July 21, 1970 — E. W. WIRFEL — 3,521,424
METHOD OF PACKAGING FOAM ARTICLES
Original Filed May 2, 1967 — 2 Sheets-Sheet 1

INVENTOR.
EMANUEL W. WIRFEL
BY Robert A. Gerlach and
Sylvia Gostonyi
ATTORNEYS.

July 21, 1970        E. W. WIRFEL        3,521,424

METHOD OF PACKAGING FOAM ARTICLES

Original Filed May 2, 1967        2 Sheets-Sheet 2

INVENTOR.
EMANUEL W. WIRFEL
BY
ATTORNEYS.

3,521,424
METHOD OF PACKAGING FOAM ARTICLES
Emanuel W. Wirfel, McKees Rocks, Pa., assignor to Mobay Chemical Company, Pittsburgh, Pa., a corporation of Delaware
Original application May 2, 1967, Ser. No. 635,498, now Patent No. 3,437,197. Divided and this application July 1, 1968, Ser. No. 770,877
Int. Cl. B65b 1/26
U.S. Cl. 53—24                                   6 Claims

ABSTRACT OF THE DISCLOSURE

Applying a sizing means to a cellular sheet material; disposing the sheeting for shipment; placing the sheeting into a flexible container which is substantially fluid impervious and which is capable of being reduced in volume; evacuating fluid from the container and permitting the container to be reduced in volume under the influence of atmospheric pressure, thereby compressing the cellular material, and enclosing the container and its contents within a mechanical restraining means such as a paper envelope.

---

This application is a division of Ser. No. 635,498, filed May 2, 1967, now Pat. No. 3,437,197.

This invention relates to the packaging of cellular sheet-like materials, and particularly, to a novel method for packaging resinous foam sheets, as well as the resulting package.

During recent years, resinous foam materials, particularly sheet-like foam materials, have met with an ever increasing demand by manufacturers for use as cushioning elements, rug underlay, insulation and the like. Due to the relatively large ratio of volume to weight of foam, however, most commercial carriers have modified their freight rates so that their shipping charges are currently on a volume basis rather than a weight basis for such materials. This factor, along with the remoteness of points of use from the location of suppliers, has necessitated considerable expense for shipping costs which correspondingly increase the cost of such materials to the consumer.

Suppliers of foam materials have attempted to solve this problem by mechanically compressing the foam to reduce its volume prior to shipment. On arrival at the point of use the foam material is removed from its package and permitted to restore itself to its initial expanded condition. However, the mechanical techniques employed in compressing and packaging the foam have resulted in either heavy and cumbersome packages because of the strength required in the wrapping material to restrain the foam material in its compressed state against its own self-restoring forces, or have involved such complicated and expensive procedures in achieving the compressed and compacted package that the savings in shipping rates are offset by the costs incurred in reducing the volume of the material.

Other processes for attacking similar problems encountered in the handling of materials which are not analogous or related to foams have been proposed but these also suffer from inherent disadvantages which preclude their application to the packaging of foam materials. For example, in the packaging of wool for shipment, a process has been proposed which involves a simple evacuation technique to remove entrained fluids from the wool contained in a fluid impervious container and then sealing the wool within the container while the wool is in a compressed state. Such a process is not suitable for the packaging of resinous foam materials such as polyurethane foam articles, however, because the foam will undergo an overall shrinkage through its transverse as well as its longitudinal dimensions so that the foam becomes distorted and shrivels up, somewhat like a prune. Such distortion of a foam article cannot be tolerated since it effects the original shape and dimensions of the foam adversely and, in some cases, permanently.

It is therefore an object of this invention to provide a method for shipping cellular resinous materials which is devoid of the foregoing disadvantages.

Another object of this invention is to provide an improved method for the shipment of cellular sheet-like materials wherein the foam is compressed through its width, the other dimensions of the foam remaining substantially uneffected.

A further object of this invention is the provision of a greatly simplified and inexpensive method for packaging cellular sheet-like materials which results in a package of substantially reduced volume as compared with the volume of the foam material in its normal and expanded state and yet which requires a minimum of equipment and materials.

Still another object of this invention is to provide an improved method for the packaging and shipment of foam rug underlay.

Other objects will become apparent from the following description with reference to the accompanying drawings which illustrate a preferred embodiment of the invention wherein.

Figure 1:
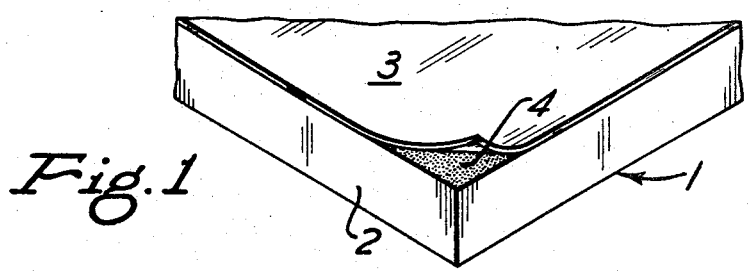
FIG. 1 is a perspective view of a sheet of foam having suitable sizing material adhered to it.

The foregoing objects and other which will become apparent from the following description and the accompanying drawings are accomplished in accordance with this invention, generally speaking, by providing a method for the packaging of a foam material having two end surfaces and at least one side surface connecting the end surfaces wherein a sizing means is applied to at least one of the side surfaces of the foam, the resulting composite is then disposed or situated for packaging, supporting means are disposed adjacent to each end surface of the foam, the foam is then enclosed within a container which is substantially fluid impervious and capable of undergoing a reduction in volume, fluid is evacuated from the container to reduce it in volume under the influence of atmospheric pressure to thereby compress the cellular material, and a mechanical restraining member is then placed around the container and its contents. The method of the invention is particularly adapted to the packaging of sheet-like cellular materials such as, for example, polyurethane foam sheets and rug underlay. In such cases, a sizing means is applied to one length by breadth surface of the cellular sheet-like material having a length and breadth substantially greater than its thickness and the composite, enclosed in a substantially fluid impervious container which is capable of collapsing under atmospheric pressure, is evacuated and the resulting package is enclosed within a suitable restraining means. As a result, a cellular sheet is obtained which is compressed in thickness but which has width dimensions substantially equal to its original width dimensions at atmospheric pressure, while the length dimension becomes corrugated, thus giving the article an axial rigidity which will prevent it from collapsing. The package obtained includes the described compressed foam encased within a substantially fluid impervious container having an internal pressure of less than atmospheric pressure and a restraining member such as a paper envelope which encompasses the fluid impervious container and is adapted to hold the package to its compressed dimensions, even if the pressure within the container were restored to atmospheric.

In order to dispose or situate the sheet-like cellular material for packaging, one may simply roll up the foam sheeting, either upon itself or upon a suitable spool of some kind. The spool may be either solid or hollow; it may be perforated or it may have nonperforated walls and it may be made of any suitable material such as, for example, cardboard, a plastic of any type, a metal of any type and the like. The advantage of using a spool with a hollow cylindrical configuration wherein the walls are perforated is that it facilitates pulling a vacuum through the center of the spool in compressing the foam material for shipment, and this embodiment is preferred.

In another embodiment, the foam may be folded or else, the sheets may be piled on top of one another in a substantially block-type of configuration or they may be wound or folded in any suitable manner before they are placed into the fluid impervious flexible container from which the air will be evacuated and in which the foam will be compressed. Alternatively, where articles other than sheet-like constructions are to be packaged, they may be disposed or situated for packaging as they are and without any further folding, bending or rolling.

Any suitable material may be used as a flexible container which is substantially fluid impervious and which surrounds the flexible cellular material to be compressed by evacuation. Some such suitable materials are, for example, thermoplastic films which may also be in the form of envelopes or bags. Some suitable materials from which the flexible container may be fabricated are, for example, polyvinyl chloride, polyamides, polypropylene, polyethylene, polyvinyl alcohol, cellulose, polycarbonate, polyvinyl acetate, copolymers of polyvinyl chloride and polyvinyl acetate, polyurethanes, any suitable polyesters such as, for example, polyethylene terephthalates, polymethacrylates, polyacrylonitrile, butadiene-acrylonitrile copolymers, polymethylacrylates, polybutadiene, collapsible and fluid impervious paper, foil such as, for example, tin foil, aluminum foil and the like, and any other such suitable material.

These same materials may also be used as the sizing means or barrier material which is adhered to the foam before it is compressed, but preferably, a polyvinyl chloride or polyethylene sheet coextensive with the foam is used. Alternatively, the sizing means may be applied around the periphery of the surface to be supported or in any other manner which will insure the retention of at least the axial dimensions of at least one of the surfaces of the foam. Hence, stripes or diagonals of sizing across the surface, or any other disposition thereof, may be employed. The sizing means may be bound to the cellular material by any suitable method such as, for example, those suggested in U.S. Pats. 2,759,475, 2,979,863, 3,026,233 and the like, as well as by the method disclosed in Belgian Pat. 669,547. Thus, any suitable method for adhering the sizing to the foam may be used and all are contemplated. In this regard, it is also pointed out that, in addition to a plastic film, any other suitable film or foil material may be used as sizing for the foam. For example, one my use aluminum foil or tin foil or any paper or other suitable chemical or physical covering through which fluids cannot pass when such paper or chemical or physical covering is possessed of its integrity. Such expedients include, for example, adhesives which form a fluid impervious barrier layer when applied to the surface of the cellular sheet-like material, as well as the barrier obtained by merely heating the surface of the cellular material and thereby causing the surface cells to become fused to one another and preclude the passage of fluid through that surface. In addition, a composite sizing means may be employed wherein any two or more of the aforementioned barriers are used together in two or more layers, either alone, or in conjunction with an additional strengthening material such as a textile or fabric, a thin metal or plastic web and the like. In some instances, for example when packaging foam sheeting, both faces of the sheeting can be covered with a barrier, although in such an embodiment the evacuation step may be somewhat more difficult or the time required for compression may be somewhat longer than in those embodiments in which only one face is covered with a barrier. When packaging other articles, two or more faces may be covered with a barrier as long as at least two unsized end surfaces remain.

Any suitable thickness may be used for the sizing means and the flexible container in the practice of this invention provided that the compression of the foam article during the evacuation step is not impaired and that the thickness does not result in either the tearing or shattering of the film or sizing in use or in such a degree of stiffness that the foam article is not handleable or that the flexible container is incapable of being sealed around the evacuation nozzle sufficiently securely to permit the efficient evacuation of fluids from the foam. Preferably, a thickness of from about 0.0005 inch to about 0.005 inch is desirable, and where a composite sizing or film is employed, the total thickness of the barrier or container should not exceed about 0.005 inch. In some circumstances it may be desirable to exceed or fall short of the preferred limits, and these cases are contemplated within the scope of this invention; however, generally, films having thicknesses below about 0.0005 inch tend to tear or shatter when used and those having a thickness of greater than about 0.005 inch are difficult to seal around the evacuation nozzle to a sufficient degree to permit the efficient evacuation of fluids from the foam.

In any event, the use of the sizing means as described herein is critical in the practice of the invention since it maintains the original width dimensions of the packaged foam and imparts an axial rigidity to the foam which assists in the efficient evacuation of fluids from the foam itself. Without such an expedient, the foam article would shrink through all of its dimensions upon the evacuation of fluids therefrom and would shrivel up like a prune, leading to possibly permanent distortion through the dimensions of the foam article. In the case of rolled foam sheeting or carpet underlay, the sizing means imparts an axial rigidity to the foam.

Another critical expedient in the practice of this invention is the supporting means which must be situated at either end of the foam article after it has been disposed for packaging and before the evacuation process begins. The supporting means are hereinafter referred to as end members, by which is meant any shape, size or thickness of a member situated at each end of the foam, and preferably at each end of the axis of the foam. Preferably, one end member is situated between the foam article and the evacuating mechanism and the other is situated at the end of the foam article opposite that most near the evacuating mechanism. The end members may be pervious or impervious to the flow of fluids and they may be of any suitable diameter or length by width dimension, thickness or shape as desired. Preferably, however, the end members should be rigid and have dimensions slightly smaller than those of the evacuated foam article so that they may be pulled away from the foam and used again in subsequent operations. In the case of the rolled foam sheeting or carpet underlay, the end members are usually discs; notwithstanding, however, any desired size, shape, thickness and so on for the end members may be employed and all are contemplated. Hence, the end members may be of the same size as or of a size larger than the size of the foam before it is evacuated. Even further, the end members may be collapsible, in which case it is preferred to employ discs having the same size and configuration as the planar ends of the foam article to be evacuated;

as the fluids are withdrawn from the foam, the collapsible disc reduces in size correspondingly to the reduction in size of the ends of the foam article. In such cases, the disc is rigid across its thickness but collapsible across its diameter at substantially the same rate of compression as the foam.

The end members may thus be prepared from any suitable material which will answer the foregoing descriptions. For example, the members may be made from cardboard, a plastic, a metal, or any other suitable material, and they may be removed from the assembly before the package is completed or they may be allowed to remain as part of the finished package. In the latter instances, it is economically unfeasible to prepare the end members from expensive plastic materials and metals such as, for example, aluminum, steel, brass, copper and the like; in such cases, cardboard, inexpensive plastics and the like are preferred. As long as the end members are rigid through their thicknesses, however, it is irrelevant of what material they are fabricated.

The criticality of these expedients resides in the discovery that, absent their use, the same pressure that collapses or shrinks the foam radially will also tend to collapse the foam axially. Thus, the cooperation of the end members and the sizing of the foam appears to be an absolute criticality in carrying out the invention.

Generally, it is preferred that the end members between the foam and the evacuating mechanism or apparatus have a hole in it to permit the hollow spool employed in a preferred embodiment of the invention to pass through the end member and thus facilitate its nexus to the evacuating mechanism, while the end member directly opposite it is a solid. Thus, the end member is adapted to receive a conduit for evacuating fluid from the container. In such cases the hollow spool may protrude beyond the situated foam article, the protruding portion being devoid of holes or perforations, and be clampel to the evacuating mechanism, or else, the nozzle or connection to the evacuating mechanism may be inserted to or through the hole in the end member. In such cases, a stop can be placed on the hollow spool or roll to position the discs or end members and keep them from sliding; after the packaging operation is completed, the tube can then be pulled out of the assembly and the discs can be removed, if desired. Alternatively, both or either the spool and/or the end members may be allowed to remain a part of the final package. In the embodiment in which the spool is removed it is preferred that, whatever material the spool may be made of, it is coated with a slip-enhancing material such as Tefln, for example, to facilitate its removal from the package. Notwithstanding the foregoing, however, it is not an absolute criticality of the invention to employ a hollow spool and, if desired, both end members may contain an opening or both may be solid. In the latter case, the connection with the evacuating mechanism is achieved by merely sealing the flexible container around the nozzle or other connection to the evacuating means with, for example, a gum band, string, rope, tape, cord, twine, an adhesive and the like. In either case, the flexible container must be substantially sealed to the evacuating mechanism, either as aforedescribed or else, in any other suitable manner.

In preparing for the evacuating step of the invention, the foam disposed or situated as described above is placed into the flexible container described hereinbefore, in much the same manner as an article in a bag, or else a film of the hereinbefore described suitable materials may be wound around the foam in any suitable manner to prepare a fluid impervious covering. The fluid may then be evacuated from the assembly in any suitable manner which will permit the container to reduce its volume and thereby compress the foam sheets. Preferably, however, a vacuum is applied to one end of a flexible container which is sealed at the other end.

Any suitable evacuating mechanism can be used in order to reduce the internal pressure of the flexible container below its external pressure and thereby achieve compression of the foam such as, for example, those disclosed in U.S. Pats. 2,764,859, 2,984,055, 2,649,234, 2,790,284 and the like. Further, if it is so desired, mechanical pressure can be applied to assist in increasing the amount of compression brought about by the surrounding atmospheric pressure.

The flexible container and its contents may be evacuated or compressed to any extent which will reduce its volume and facilitate handling of the product. Although the degree of compression of the foam is usually determined by the space available for accommodating the package, it has been found advantageous, particularly in packaging rug underlay, to compress the foam to from about 20 percent to about 80 percent of its initial volume. Generally, however, the density and degree of flexibility of the foam will be the determining factor, as well as the availability and efficiency of the compressing or evacuating equipment on hand.

In order to avoid unscheduled or premature expansion of the compressed package, a restraining member sufficiently strong to hold the cellular material in its compressed state after fluid has been readmitted to the package is placed around the compressed package. The restraining member employed may be of substantially the same size as the compressed material and thus hold the container at substantially its compressed volume. In such a case, it is preferable that a sheet of some suitable material be wrapped around the compressed container and contents and taped in place before the package is removed from the evacuating mechanism. Alternatively, the restraining member may be of a greater size than the compressed container, thus permitting the foam to expand against and assume the shape and size of the mechanical restraint. In such an embodiment a sleeve of some suitable material may simply be drawn over the evacuated assembly which is then permitted to reexpand. Preferably, the restraining member is wrapped around the compressed assembly and taped in place, precluding reexpansion of the foam therein. The resulting package may thus be retained in its evacuated state for a prolonged period of time, for example while it is being stored or transported, although it is preferable that fluid be admitted into the container until the pressure is again substantially atmospheric. In such a case, the restraining member will prevent substantial expansion of the compressed material or a change in its shape.

In one embodiment, the packaging process of the invention permits the variation that after the fluid is removed from the foam in the flexible container which is then surrounded with a mechanical restraining means having a greater dimension than the flexible container and compressed foam but lesser dimension than that of the package prior to evacuation, the same fluid or else any other suitable fluid such as nitrogen, argon, water, vapors of water or a nondegrading solvent can be admitted to the package or about it if a fluid impervious container larger than the volume of the package is provided. In this manner an inert atmosphere can be made to surround the foam, either intercellularly when it is admitted inside the flexible container or extracellularly when it is admitted to the outside of the flexible container. By this device, the foam may be protected from large temperature variations during its shipment as well as from degradative vapors and pressures to which it may possibly be subjected.

The mechanical restraining means may be any suitable material such as, for example, rope, chain, paper, cardboard, cloth or fabric of any kind, adhesive sheets which may or may not adhere to the flexible container, a sleeve of some type such as, for example, a wood, metal or plastic pipe or hollow spool; a paper, metal, cardboard, wood or plastic box or the like as well as any other means which may act as a suitable mechanical restraint for compressed foam encapsulated within a flexible container. In the embodiment wherein a fluid is admitted between the flexible container and the restraining means, the restraining means must necessarily be fluid impervious.

The method of this invention may be used to package any suitable flexible porous materials such as, for example, those prepared from polyurethanes, olefins or polyolefins, polyesters such as, for example, polyethylene terephthalates and the like, epoxy resins, polyproplene, polyethylene, styrene, polystyrene, polyvinyl alcohol, polyvinyl chloride, polyvinyl acetate, copolymers of the foregoing and similar cellular materials and the like, although the invention is especially suitable in the compression and packaging of cellular polyurethane foam materials. Methods for making such cellular materials as well as other types of cellular materials which may be processed in accordance with this invention are known and any of the cellular materials prepared thereby can be processed in accordance with this invention provided they are sufficiently flexible to be compressed without permanent deleterious effects on the product. Generally, the foam should have open cells to permit the efficient evacuation of fluids therefrom.

Figure 2:
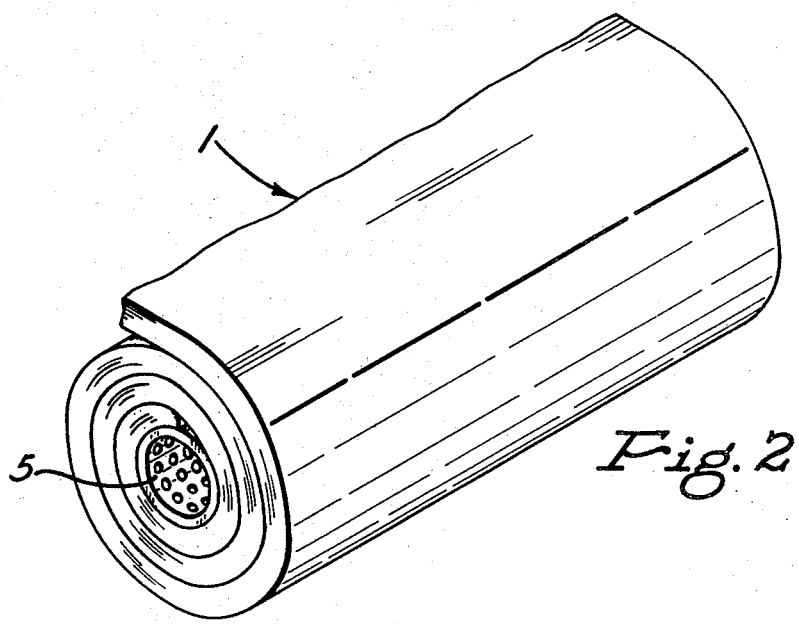
FIG. 2 is a perspective view of the sized foam sheet being rolled up on a spool.
Figure 3:
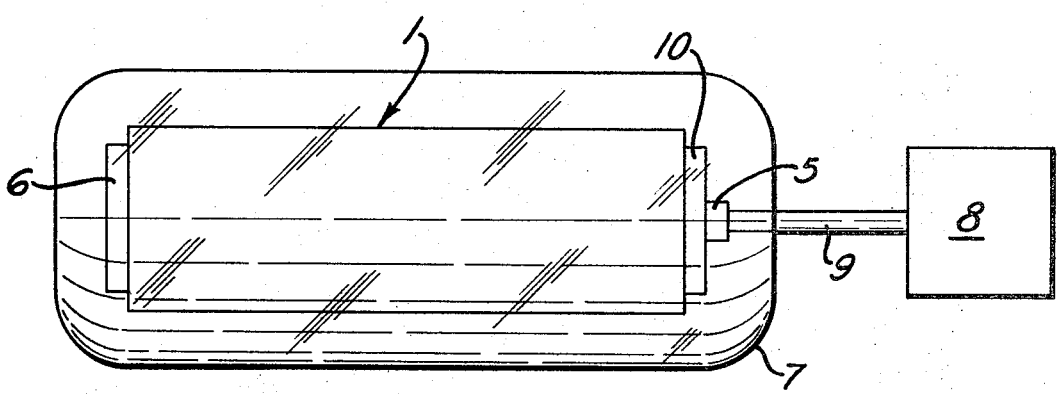
FIG. 3 is a side view of the rolled foam encased in a flexible container attached to an evacuating means.
Figure 4:
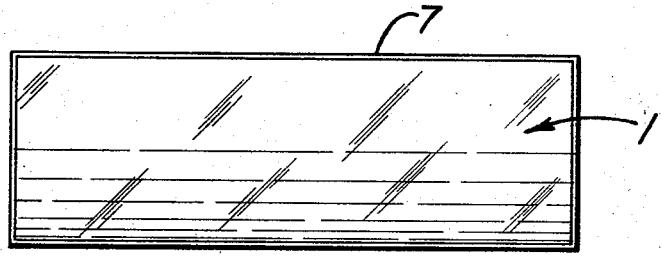
FIG. 4 is a perspective view of the compressed foam in a collapsed, substantially fluid impervious container.
Figure 5:
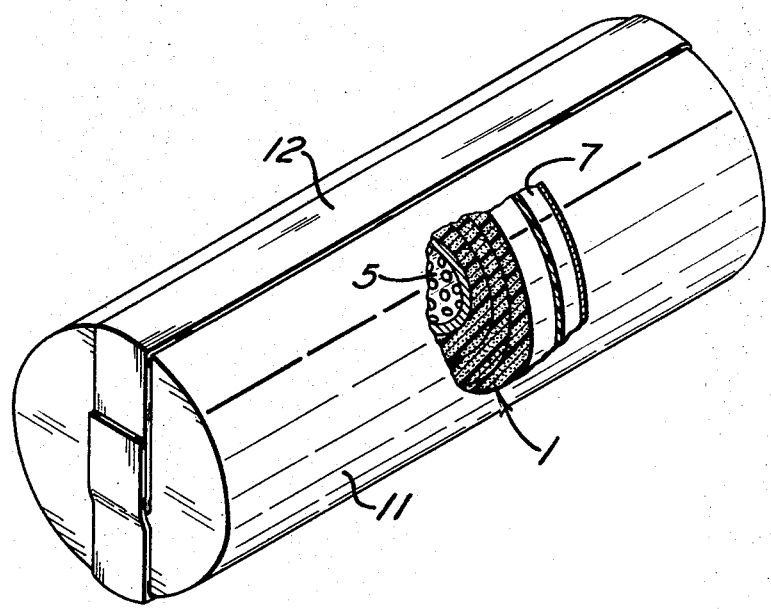
FIG. 5 is a perspective view of the compressed foam encased within a mechanical restraining means.

A preferred embodiment of the invention is illustrated in the accompanying drawings wherein FIG. 1 shows about a 0.002 inch thick polyvinyl chloride film 3 being adhered to the polyurethane foam sheet 2 with a polyvinyl chloride plastisol 4 similar to that disclosed in Belgian Pat. 669,547 which has previously been applied to the surface of the foam sheet 2 as disclosed in the Belgian patent. FIG. 2 shows the laminate 1 thus prepared rolled up on a hollow cylinder or spool 5 which has perforated side walls. FIG. 3 shows the rolled up foam with rigid discs 6 and 10 at either end, disc 6 being solid and disc 10 having a hole therethrough to permit protrusion of the spool 5, thus enabling ease of connection with conduit 9 connected to a vacuum pump 8. The rolled foam is encased within a .0015 inch thick polyethylene bag 7 which serves as the flexible, fluid impervious container. FIG. 4 shows the foam, compressed by the atmosphere to about one third of its initial volume within the flexible container 7. FIG. 5 shows the rolled up and compressed foam 1 and container 7 enclosed in a layer of kraft paper 11 which is strong enough to maintain the foam at its compressed volume, even after the pressure inside the package is restored to atmospheric by the admission of fluid. The kraft paper 11 is secured in place by tape 12.

The resulting package has a significantly reduced volume and requires much less space during storage or shipping. This is a particularly significant factor in the packaging and shipment of high bulk articles such as, for example, rug underlay. In such cases, the underlay may be integral or perforated and it may be made of any type of compressible material, although foam underlay is most amenable to packaging by the instant method. Further, this process precludes the difficulty and impracticality of compressing foam solely by mechanical means. Ordinarily, no large mechanical equipment is required in order to compress the foam in accordance with this invention since a simple vacuum pump or any other suitable suction means may be used to efficiently and effectively bring about compression of the foam within a flexible container sealed to the nozzle or other connection of the evacuating mechanism. Thus the size, weight and density of the package to be shipped may be easily and readily controlled. Further, if fluid is not readmitted prior to shipment, a shipping package is obtained whereby the cellular material receives the double protection of the outer mechanical restraining material as well as that of the fluid impervious and thus air and humidity tight inner flexible container to preclude degradation due to atmospheric temperature, pressure, air, humidity and vapor contact.

Primarily, however, the process of the instant invention presents the advantage that the cellular sheet material is compressed only through the thickness dimension of the sheet, rather than through all of its dimensions, thus preventing a substantial distortion of the sheet which may delay its use while it recovers its original shape or may in subsequent use as carpet underlay, for example, cause rippling and deformation of the carpeting material which is placed over it. In addition, the instant process may be used to package foam masses having shapes other than that of a foam sheet such as, for example, foam cubes and rectangles, cylinders, rhomboids and the like, including articles such as toys, insulation, padding, cushions, mattresses and the like.

Although the invention has been described in considerable detail in the foregoing, it is to be understood that such detail is solely for the purposes of illustrations and that variations may be made by those skilled in the art without departing from the spirit and scope of the invention except as is set forth in the claims.

What is claimed is:

1. A method for the packaging of foam articles having two end surfaces and at least one side surface connecting the end surfaces which comprises applying a sizing material to at least one of the side surfaces, placing supporting means adjacent each end surface, placing the foam assembly into a flexible, substantially fluid impervious container, evacuating fluid from the container to reduce it in volume and compress the foam, and enclosing the compressed container within a mechanical restraining member.

2. The method of claim 1 wherein fluid is admitted to the flexible container after the restaining means is in place.

3. The method of claim 1 wherein a polyvinyl chloride film having a thickness of about 0.002 inch is applied to a flexible polyurethane sheet, the sheet is wound up on a hollow, perforated, cylindrical spool and the evacuated product is wrapped in kraft paper which is secured in place with tape.

4. The method of claim 1 wherein the foam article is a cellular sheet having length and breadth dimensions substantially greater than its thickness and the sizing means is applied on at least one of the length by breadth surfaces of the sheet.

5. The method of claim 4 wherein the sized sheet is rolled up on a spool before it is placed into the fluid impervious container.

6. The method of claim 5 wherein the supporting means and the spool are removed from the package after the application of the restraining means.

References Cited

UNITED STATES PATENTS

| 2,814,382 | 11/1957 | Lassiter | 53—22 X |
| 3,254,467 | 6/1966 | Garrow et al. | 53—24 |
| 3,307,319 | 3/1967 | Christensen et al. | 53—22 |

TRAVIS S. McGEHEE, Primary Examiner

U.S. Cl. X.R.

53—22